(No Model.)
T. B. RICKETTS.
GATE.
No. 576,156.
Patented Feb. 2, 1897.
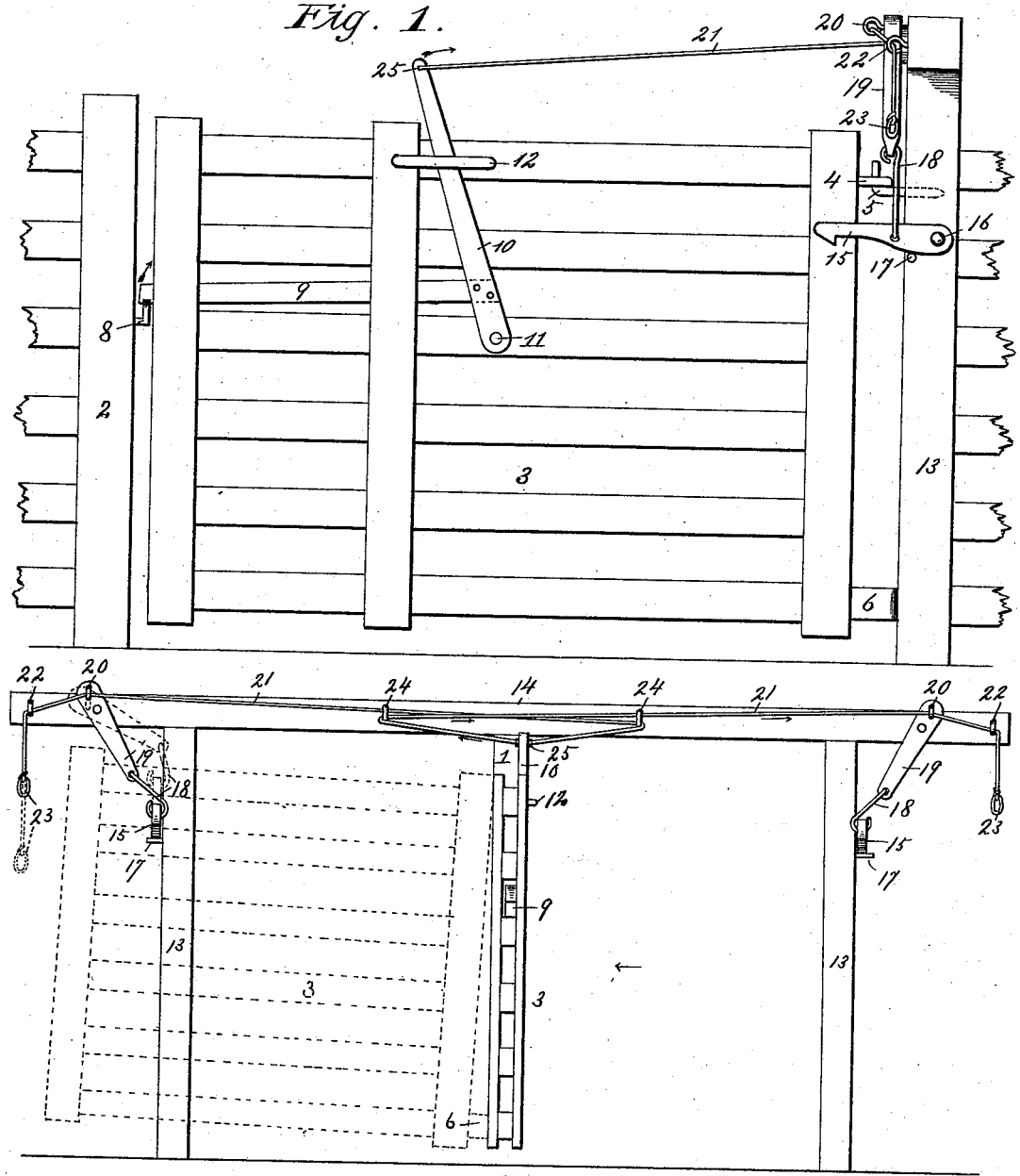
Witnesses:
F. G. Fischer
G. Y. Thorpe
Inventor:
T. B. Ricketts
By Higdon & Higdon
Attys.
THE NORRIS PETERS CO., PHOTO-LITHO., WASHINGTON, D. C.

UNITED STATES PATENT OFFICE.

THOMAS B. RICKETTS, OF LIBERTY, MISSOURI.

GATE.

SPECIFICATION forming part of Letters Patent No. 576,156, dated February 2, 1897.

Application filed July 9, 1896. Serial No. 598,616. (No model.)

*To all whom it may concern:*

Be it known that I, THOMAS B. RICKETTS, of Liberty, Clay county, Missouri, have invented certain new and useful Improvements in Gates, of which the following is a full, clear, and exact description, reference being had to the accompanying drawings, forming a part thereof.

My invention relates to gates, and more particularly to that class which may be easily opened and closed by a person on a vehicle, the object of the invention being to produce a gate of this character which is easily operated, which is not liable to get out of order, and which is simple, strong, and cheap of construction.

With these objects in view the invention consists in certain novel and peculiar features of construction and combinations of parts, as will be hereinafter described and claimed.

In order that the invention may be fully understood, I will proceed to describe it with reference to the said accompanying drawings, in which—

Figure 1 presents a side view of the gate in its closed position. Fig. 2 presents a front view of the gate in its closed position in full lines and in its opened position in dotted lines. Fig. 3 presents a bottom plan view of the hinge end of the gate and of the hinge-post.

Referring to the said drawings in detail, 1 designates the hinge-post.

2 designates the latch-post.

3 designates the gate, which may be of any suitable or preferred construction. It is provided at its upper end with the customary eyebolt 4, engaging the vertically-disposed hook 5, projecting from the hinge-post and forming, in conjunction with said eyebolt, the upper hinge of the gate.

6 designates a U-shaped bracket which is secured to the gate near the lower end and embraces a smaller but similarly-formed bracket 7, projecting from the lower end of the hinge-post, said brackets together constituting the lower member of the hinge, which, when the gate is opened, causes it to tilt upwardly at its outer end by reason of the fact that its lower inner end is projected outwardly from the hinge-post farther than its upper end, which remains practically the same distance from the hinge-post, owing to the relation between the eyebolt 4 and hook 5. When the gate is closed, the relation between said hinges is such that the gate reassumes its proper horizontal position, as shown most clearly in Fig. 1. Owing to the fact, however, that it tilts at its upper end when opened it is obvious that unless some means are provided to hold it open it will immediately close upon being released. The mechanism for accomplishing this will be presently explained.

8 designates the customary latch-hook, projecting inwardly from the latch-post, and 9 the latch-bar, carried rigidly by the lever 10, pivoted, as at 11, to the gate and guided and limited as to its movement in the bail or loop 12, secured to the gate near its upper end.

At opposite sides of the hinge-post and in line therewith or parallel to the roadway are erected the posts 13, and connecting said posts and bridging the hinge-post is the bar 14. Arranged at the proper height and projecting transversely of and toward the roadway are downwardly-disposed hooks 15, pivotally mounted, as at 16, upon the posts 13, and limited as to their downward movement by the stop-pins 17, projecting from said posts. Said hooks are also pivotally connected by the links 18 to the levers 19, pivotally mounted upon the bar 14, and adapted to swing parallel with the roadway. Above their pivotal points said levers are provided with guide loops or eyes 20, through which extend operating cords or cables 21. Said cords or cables slope downwardly from each side of said guide loops or eyes and outward thereof, extend through guide-loops 22, carried by the bar 14, and hang pendently downward therefrom within reach of a person on foot, on horseback, or in a vehicle, being provided at their lower ends with loops or handles 23. Inward of said levers said cords or cables extend through the guide-loops 24, one being located at each side of the gate, and then the cords are bent back and are attached to the upper end of the lever 10, as at 25. If desired, of course said cord or cable may be continuous—that is, may be attached at its middle to said lever and then follow the course illustrated and described.

It is to be understood, of course, that the guide-loops 22 and 24, and also the guide-loops 20, if desired, may be dispensed with and ordinary guide-pulleys used in lieu thereof, so as to reduce friction to the minimum, but as pulleys are mechanical equivalents of the devices shown it is not deemed necessary to illustrate them in this connection.

In practice when a person approaches the gate, say in the direction indicated by the arrow, Fig. 2, whether on foot, on horseback, or in a vehicle, he simply grasps the handle 23 of the adjacent cord or cable, and pulling down upon the same throws the gate to the position indicated in dotted lines, Fig. 2. As it reaches such position one of the rails of the same strikes and lifts, and is then engaged by the opposing latch 15, so as to hold the gate in such open position. He then passes through the gateway, and after such passage grasps the handle 23 of the other cord or cable, and pulling down upon the same exerts a downward pull upon the loop 20 of the adjacent lever 19, and consequently pivotally operates said lever and lifts its connected hook 15 from engagement with the rail of the gate, which, therefore, owing to its inclined or tilted position, immediately and automatically closes. When traveling in the opposite direction, the same operation is performed.

Thus it will be seen that I have produced a gate which is simple and cheap of construction, easily operated, and which cannot readily get out of repair, owing to the fact that there are no minute parts or mechanism employed in its construction.

It is to be understood, of course, that changes in the form, proportion, or detail construction, and the substitution of mechanical equivalents, may be made without departing from the spirit and scope of my invention.

Having thus described the invention, what I claim as new, and desire to secure by Letters Patent, is—

1. The combination of a gate, a post to which it is hinged, posts at opposite sides of the hinge-post, dogs pivoted to said posts, levers linked to said dogs, guide-loops projecting from said levers above their pivotal points, and cords or cables extending through said guide-loops and adapted, when pulled downwardly, to operate said levers and consequently said dogs, substantially as described.

2. The combination of a gate, a hinge-post carrying the same, a latch-hook-carrying post, a lever pivoted to the gate, provided with a latch engaging said hook, a gate-loop for said lever, posts at opposite sides of the hinge-posts, a bar connecting them at their upper ends, guides carried by said bars, cables extending through said guides and having their free ends at opposite sides of the gate and their opposite ends attached to the upper end of the gate-lever, dogs pivoted to the posts at opposite sides of the hinge-post, stop-pins below the same, levers pivoted to said bar and linked to said dogs, and loops projecting from said levers above their pivotal points, through which said cables extend, all arranged substantially as shown and described.

In testimony whereof I affix my signature in presence of two witnesses.

THOMAS B. RICKETTS.

Witnesses:
M. R. REMLEY,
G. Y. THORPE.